(12) United States Patent
Kim et al.

(10) Patent No.: US 9,350,006 B2
(45) Date of Patent: May 24, 2016

(54) ELECTRODE ASSEMBLY AND ELECTROCHEMICAL DEVICE INCLUDING THE SAME

(71) Applicant: LG CHEM, LTD., Seoul (KR)

(72) Inventors: Hyuk Su Kim, Daejeon (KR); Dae Geun Ku, Daejeon (KR); Jun Woo Huh, Daejeon (KR); Hyang Mok Lee, Daejeon (KR); Chang Bum Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 133 days.

(21) Appl. No.: 14/264,401

(22) Filed: Apr. 29, 2014

(65) Prior Publication Data

US 2015/0147629 A1 May 28, 2015

Related U.S. Application Data

(63) Continuation of application No. PCT/KR2013/010836, filed on Nov. 27, 2013.

(51) Int. Cl.
*H01M 2/26* (2006.01)
*H01M 2/16* (2006.01)
(Continued)

(52) U.S. Cl.
CPC ............ *H01M 2/1673* (2013.01); *H01G 11/28* (2013.01); *H01M 2/166* (2013.01); *H01M 2/1646* (2013.01); *H01M 2/1653* (2013.01); *H01M 10/4235* (2013.01); *H01M 2200/00* (2013.01); *Y02E 60/13* (2013.01); *Y02T 10/7022* (2013.01)

(58) Field of Classification Search
CPC .............................. H01M 2/26; H01M 2/1673
See application file for complete search history.

(56) References Cited

U.S. PATENT DOCUMENTS

| | | | |
|---|---|---|---|
| 6,335,114 B1 * | 1/2002 | Ueshima | H01M 2/0285 429/161 |
| 2003/0224242 A1 * | 12/2003 | Kaito | H01M 2/08 429/94 |

(Continued)

FOREIGN PATENT DOCUMENTS

| | | |
|---|---|---|
| CN | 1728439 A | 2/2006 |
| CN | 101926028 A | 12/2010 |

(Continued)

OTHER PUBLICATIONS

Extended European Search Report, issued Jul. 17, 2015, for European Application No. 13838063.9.

*Primary Examiner* — Stewart Fraser
(74) *Attorney, Agent, or Firm* — Birch, Stewart, Kolasch & Birch, LLP

(57) ABSTRACT

Disclosed is a technology for preventing electrodes in a secondary battery from being short-circuited with each other. An electrode assembly includes a cathode and anode of which a cathode collector and anode collector are coated with a cathode active material and anode active material, respectively, and a separator disposed between the cathode and the anode. An insulation layer is disposed on a tab part of the cathode collector constituting the cathode. Thus, an insulation layer may be disposed on an end (a tab part) of the cathode collector that is used as a tab of the cathode electrode in the structure of the electrode assembly to prevent the cathode from being physically short-circuited with the anode in the sequentially stacked structure of cathode/separator/anode.

13 Claims, 4 Drawing Sheets

(51) Int. Cl.
*H01M 10/42* (2006.01)
*H01G 11/28* (2013.01)

(56) References Cited

U.S. PATENT DOCUMENTS

| | | | |
|---|---|---|---|
| 2004/0126654 A1* | 7/2004 | Sudano | H01M 2/16 429/162 |
| 2004/0202928 A1 | 10/2004 | Miyamoto et al. | |
| 2006/0051663 A1 | 3/2006 | Fujita et al. | |
| 2006/0216609 A1 | 9/2006 | Abe et al. | |
| 2007/0224493 A1 | 9/2007 | Higuchi et al. | |
| 2010/0285342 A1 | 11/2010 | Lee et al. | |
| 2012/0082891 A1* | 4/2012 | Ahn | H01M 2/1673 429/211 |
| 2012/0115030 A1 | 5/2012 | Tanaka et al. | |
| 2012/0244423 A1* | 9/2012 | Kusukawa | H01M 10/0585 429/178 |
| 2012/0288747 A1* | 11/2012 | Naoi | H01G 11/12 429/178 |
| 2012/0321924 A1 | 12/2012 | Ahn | |
| 2013/0309566 A1* | 11/2013 | Umehara | H01M 4/13 429/211 |
| 2014/0011064 A1 | 1/2014 | Matsuda et al. | |
| 2014/0079992 A1 | 3/2014 | Tanaka | |

FOREIGN PATENT DOCUMENTS

| | | |
|---|---|---|
| EP | 2 437 330 A1 | 4/2012 |
| JP | 2001-93583 A | 4/2001 |
| JP | 2004-259625 A | 9/2004 |
| JP | 2006-302877 A | 11/2006 |
| JP | 2009-37833 A | 2/2009 |
| JP | 2012-79696 A | 4/2012 |
| JP | 2012-204179 A | 10/2012 |
| JP | 2013-191550 A | 9/2013 |
| KR | 10-0695968 B1 | 3/2007 |
| KR | 10-2007-0096882 A | 10/2007 |
| KR | 10-2012-0034567 A | 4/2012 |
| KR | 10-2012-0048508 A | 5/2012 |
| KR | 10-1252969 B1 | 4/2013 |
| WO | WO 2012/128160 A1 | 9/2012 |
| WO | WO 2012/164642 A1 | 12/2012 |

* cited by examiner

ELECTRODE ASSEMBLY AND ELECTROCHEMICAL DEVICE INCLUDING THE SAME

CROSS REFERENCE TO RELATED APPLICATIONS

This application is a continuation of PCT International Application No. PCT/KR2013/010836 filed on Nov. 27, 2013, which is hereby expressly incorporated by reference into the present application.

BACKGROUND OF THE INVENTION

1. Field of the Invention

The present invention relates to a technology for preventing electrodes from being short-circuited with each other in a secondary battery.

2. Description of the Related Art

Recently, lithium secondary batteries, which are chargeable/dischargeable and lightweight and have high energy density and high output density, have been widely used as energy sources for wireless mobiles devices. Lithium secondary batteries have also attracted considerable attention as power sources for hybrid electric vehicles (HEVs), plug-in hybrid electric vehicles (PHEVs), battery electric vehicles (BEVs), and electric vehicles (EVs), which have been developed to solve limitations such as air pollution and greenhouse gases that are caused by existing internal combustion engine vehicles that use fossil fuels such as gasoline and diesel vehicles.

Lithium secondary batteries are classified by electrode type into lithium ion batteries that use liquid electrolyte and lithium polymer batteries that use polymer electrolyte. Further, lithium secondary batteries are classified into cylindrical-type, prismatic-type, or pouch-type lithium secondary batteries according to the shape of their casing in which an electrode assembly is accommodated.

Among these, the pouch-type lithium secondary battery has a pouch exterior including a metallic layer (foil) and a multi-layered synthetic resin film which are applied to top and bottom surfaces of the metallic layer. Thus, the pouch-type lithium secondary battery may be developed as a lightweight lithium secondary battery and changed into various shapes because it is possible to significantly reduce the weight of the battery in comparison with the cylindrical-type or prismatic-type secondary lithium secondary battery which utilizes a metallic can.

The pouch exterior includes upper and lower exteriors which are formed by folding a middle portion of one side of a rectangular casing in a longitudinal direction. Here, press processing may be performed on the lower exterior to form a space part for accommodating an electrode assembly. Various electrode assembles having a structure, in which a cathode, a separator, and an anode that have mainly plate shapes are stacked, are accommodated in the space part of the lower exterior. Then, an electrolyte is injected, and edges around the space part of the lower exterior are closely attached to edges of the upper exterior corresponding to the lower exterior. Thereafter, the closely attached portions are thermally welded to form the sealed pouch-type secondary battery.

FIG. 1 is a schematic exploded perspective view illustrating a general structure of a representative pouch-type secondary battery according to a related art.

Referring to FIG. 1, a pouch-type secondary battery 1 includes an electrode assembly 10, electrode tabs 31 and 32 extending from the electrode assembly 10, electrode leads 51 and 52 welded to the electrode tabs 31 and 32, and a battery case 20 accommodating the electrode assembly 1.

The electrode assembly 10 may be a power generation device in which a cathode and an anode are successively stacked with a separator therebetween. The electrode assembly 10 has a stacked or stacked/folded type structure. The electrode tabs 31 and 32 extend from electrode plates of the electrode assembly 10, respectively. The electrode leads 51 and 52 are electrically connected to the plurality of electrode tabs 31 and 32 respectively extending from the electrode plates through welding, respectively. Here, a portion of each of the electrode leads 51 and 52 is exposed to the outside of the battery case 20. Also, an insulation film 53 may be attached to a portion of each of top and bottom surfaces of the electrode leads 51 and 52 to enhance sealability and secure electrical insulation with respect to the battery case 20.

Also, the plurality of cathode and anode tabs 31 and 32 are integrally coupled to form welded portions, respectively. Thus, an inner, upper end of the battery case 20 is spaced a predetermined distance from a top surface of the electrode assembly 10, and each of the tabs 31 and 32 of the welded portions is bent in an approximately V shape (hereinafter, coupled portions of the electrode tabs and the electrode leads are called V-forming portions 41 and 42). The battery case 20 is formed with an aluminum laminate sheet and provides a space for accommodating the electrode assembly 10. Also, the battery case 20 has an overall pouch shape. After the electrode assembly 10 is built in an accommodation part of the battery case 20, and then an electrolyte (not shown) is injected, outer circumferential surfaces at which an upper laminate sheet and a lower laminate sheet of the battery case 20 contact each other are thermally welded to manufacture the secondary battery.

FIG. 2 is a conceptual view for explaining structural limitations of the above-described electrode assembly.

As shown in FIG. 2, the electrode assembly 10 is embodied in a structure in which the cathode and the anode are stacked. Also, the electrode 10 includes the electrode tabs 31 and 32 connected to collectors that constitute the cathode and the anode. Here, in FIG. 2, a portion expressed by aluminum (Al) foil 31 is the cathode tab 31, and a portion expressed by copper (Cu) foil 32 is the anode tab 32. Particularly, in the electrode assembly, the cathode that is coated with a cathode active material on the collector and the anode that is coated with an anode active material on the collector are stacked on each other. Also, a separator for preventing the cathode and the anode from being physically short-circuited with each other is inserted between the cathode and the anode. In this case, to reduce the risk of a physical short circuit between the cathode and the anode in a normal electrode assembly, the anode may have a size greater than the cathode. However, physical short circuits between the cathode and the anode may frequently occur due to the contraction of the separator in a high temperature atmosphere.

SUMMARY OF THE INVENTION

An aspect of the present invention provides a secondary battery in which an insulation layer is disposed on an end (a tab part) of a cathode collector that is used as a tab of a cathode electrode in a structure of an electrode assembly to prevent the cathode from being physically short-circuited with an anode in a sequentially stacked structure of cathode/separator/anode.

According to another aspect of the present invention, there is provided an electrode assembly including: a cathode and anode of which a cathode collector and anode collector are coated with a cathode active material and anode active material, respectively; and a separator disposed between the cathode and the anode, wherein an insulation layer is disposed on a tab part of the cathode collector constituting the cathode. Thus, in the sequentially stacked structure of cathode/separator/anode, physical short circuits between the cathode and the anode may be prevented.

According to the present invention, the insulation layer may be disposed on the end (the tab part) of the cathode collector that is used as the tab of the cathode electrode in the structure of the electrode assembly to prevent the cathode from being physically short-circuited with the anode in the sequentially stacked structure of cathode/separator/anode.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
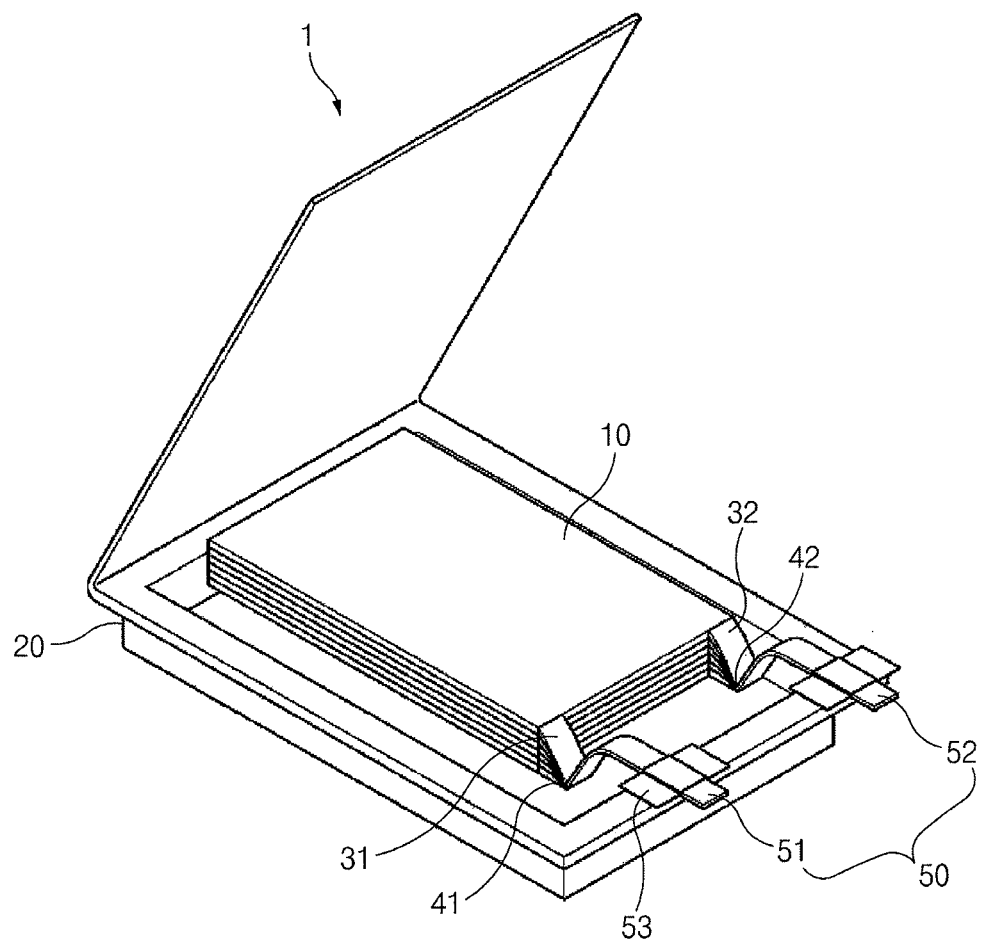
FIG. 1 is an exploded perspective view illustrating a structure of a secondary battery.
Figure 2:
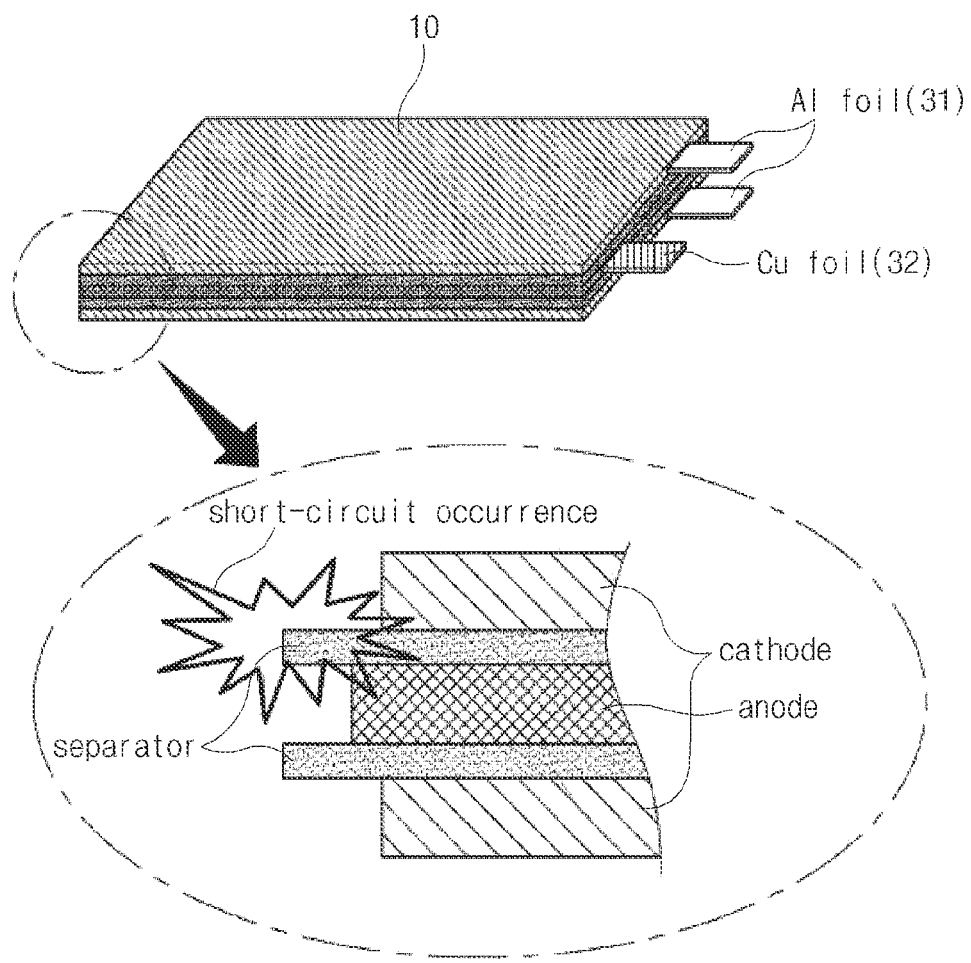
FIG. 2 is a conceptual view for explaining structural limitations of the secondary battery.

Exemplary embodiments of the present invention will now be described in detail with reference to the accompanying drawings. In the description with reference to the attached drawings, like reference numerals in the drawings denote like elements, and thus repetitive descriptions thereof will not be provided. Though terms like "first" and "second" are used to describe various components, the components are not limited to these terms. These terms are used only to differentiate one component from another.

Figure 3:
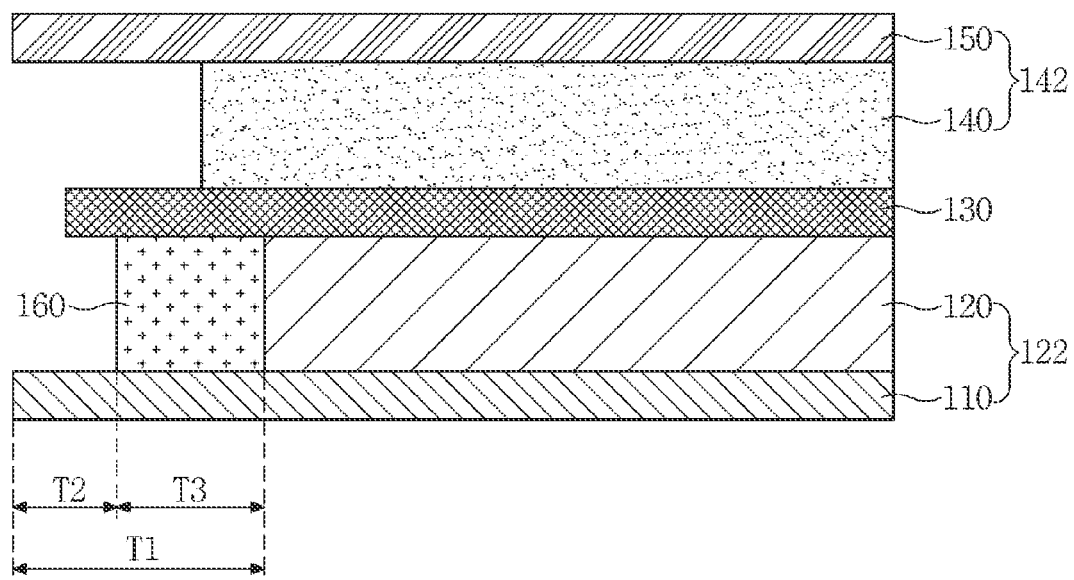
FIG. 3 is a cross-sectional view illustrating a structure of an electrode assembly according to the present invention.
Figure 4:
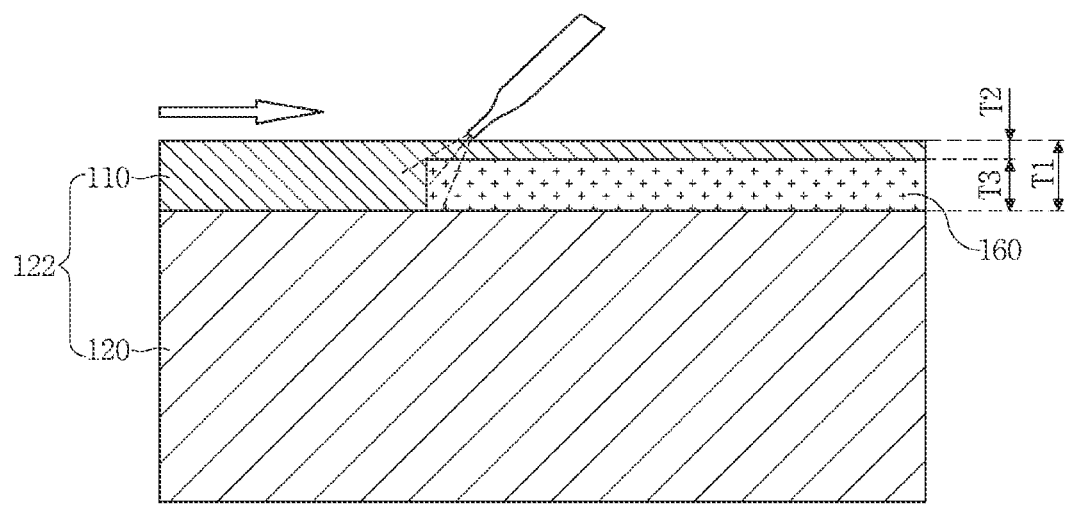
FIG. 4 is a plan view of a method for forming an insulation layer on a tab part of a cathode collector according to the present invention.

FIG. 3 is a cross-sectional view illustrating a structure of an electrode assembly according to the present invention, and FIG. 4 is a plan view of a method for forming an insulation layer on a tab part of a cathode collector according to the present invention.

Referring to FIGS. 3 and 4, an electrode assembly according to the present invention may include a cathode 122 of which a cathode collector 110 is coated with a cathode active material 120, an anode 142 of which an anode collector 150 is coated with an anode active material 140, a separator 130 disposed between the cathode and the anode, and an insulation layer 160 disposed on a tab part of the cathode collector 110 constituting the cathode 122.

Particularly, the insulation layer 160 according to the present invention may be disposed between the cathode collector 110 and the separator 130 and be disposed to partially overlap an area that is coated with the anode active material 140. That is, since the anode has a size greater than the cathode, a non-overlapping area T3 may exist between the anode and the cathode. In general, since short circuiting between the electrodes occurs due to the non-overlapping area T3, the insulation layer 160 may be disposed on the non-overlapping area T3.

That is, the insulation layer 160 may be disposed to partially overlap an area that is coated with the anode active material 140. Typically, the insulation layer 160 may be connected to an end of the area that is coated with the cathode active material 120. Also, the insulation layer 160 may be disposed to form an exposed portion T2 that is defined by exposing an end of the tab part. Furthermore, the insulation layer 160 may have a width (the area T3) of about 1 mm to about 20 mm. In this case, the insulation layer 160 itself may have a thickness of about 1 μm to about 100 μm. The total length T1 of the exposed portion T2 and the insulation layer 160 may be about 20 mm to about 30 mm.

FIG. 4 is a plan view of the cathode 122 in a state where the cathode active material 120 is applied to the cathode collector 110 in FIG. 3.

As shown in FIG. 3, the method for forming the insulation layer 160 may be realized as a method in which an insulation material is applied on an end of the area of the cathode collector 110 that is coated with the cathode active material 120 in a width direction of the collector.

Alternatively, as shown in FIG. 4, the method for forming the insulation layer 160 may be realized by applying an insulation material containing at least one ceramic material. For example, the insulation layer 160 may be formed by applying at least one material or a mixture of at least two materials selected from titanium dioxide, calcium carbonate, and barium sulfate or applying a solution or paint that contains about 10% to about 90% by weight ratio of titanium dioxide, calcium carbonate, and barium sulfate.

Further, the insulation layer 160 may be realized by bonding and applying a polymer film or emulsion having a weight-average molecular weight of about 200,000 or less onto the tab part. In this case, the polymer film is formed of at least one material selected from the group consisting of polyacrylate, polystyrene, polyacrylic acid, polyacrylonitrile, polyethylene, polypropylene, polyimide, polyurethane, and polyethylene terephthalate. Alternatively, the polymer film may be formed of a styrene-butadiene rubber (SBR)-based polymer.

That is, the insulation layer 160 according to the present invention may be realized by using various methods such as electrospinning, printing, spray coating, and tapping.

Experimental examples for confirming whether a contact defect occurs through the secondary battery including the electrode leads according to the present invention will be described below. The electrode assembly according to the present invention may constitute the secondary battery in one of jelly-roll-type, stacked-type, and stacked/folded type structures. Hereinafter, embodiments of the present invention will be described in more detail. It is noted that the embodiments below are not intended to limit the scope of the claims of the present invention, but are used to exemplify the detailed description of the present invention.

Embodiment

In a top part of a cathode collector, an electrode assembly is manufactured by using a material and method that are well known in the art except that an insulation layer is formed to a width of about 10 mm and a thickness of about 10 from an end of a cathode active material.

In the current embodiment, the insulation layer is formed by using a solution containing a polymer, which is a modified SBR-based polymer, including a small amount of at least one monomer selected from the group consisting of acrylic acid, acrylonitrile, and ethylhexyl acrylate which contain butyl acrylate and styrene as main components, or using a solution in which titanium dioxide is dispersed into water or methyl alcohol. Thereafter, one hundred electrode assemblies are manufactured by using the insulation layer. Each of the manufactured electrode assembles is built in an accommodation part of a battery case. Then, a plurality of electrode tabs extending from a collector of the electrode assembly to protrude and a lead part are welded to form a V-forming portion. Thereafter, an electrolyte is injected, and outer circumferential surfaces on which an upper laminate sheet and a lower laminate sheet of the battery case contact each other are thermally welded to seal the battery case, thereby manufacturing a total of one hundred pouch-type secondary batteries.

Comparison Example

Pouch-type secondary batteries are manufactured by the same method as in the foregoing embodiment except that the insulation layer is omitted.

Experimental Example

Test results obtained by exposing the batteries manufactured in the embodiment and the comparison example at temperatures of about 100° C., 150° C., and 200° C. are shown in Table 1 below.

In this experimental example, the above-described test is repeatedly performed on the one hundred batteries to measure whether the short circuit occurs at the anode.

TABLE 1

| | Number of occurrences of physical short circuit in anode |
|---|---|
| Embodiment | 0 |
| Comparison example | 13 |

In the test, the physical short circuit does not occur in all of the one hundred secondary batteries, each of which is provided with the insulation layer, to which the cathode structure of the present invention is applied. However, it is seen that a defect rate of about 13% occurs in the general comparison example.

Hereinafter, a specific material and a structural feature of an individual component constituting the electrode assembly that is provided with the above-described insulation layer according to the present invention will be described.

Cathode Structure

An electrode formed on the basic unit body in the present invention is classified into a cathode and an anode. The cathode and the anode are mutually coupled to each other with a separator therebetween to manufacture the electrode. For example, the cathode may be manufactured by applying a mixture of a cathode active material, a conductive material, and a binder on a cathode collector and then performing drying and pressing processes on the cathode collector on which the mixture is applied. As necessary, a filler may be added to the mixture. This structure may be realized in the form of a sheet and then applied to a process in a shape in which the sheet is mounted on a loading roll.

[Cathode Collector]

Generally, the cathode collector is generally fabricated to have a thickness of about 3 μm to about 500 μm. The cathode collector is not particularly limited so long as it has high conductivity without causing adverse chemical changes in the batteries. The cathode collector may be formed of, for example, stainless steel, aluminum, nickel, titanium, fired carbon, or aluminum or stainless steel that is surface-treated with one of carbon, nickel, titanium, silver, or the like. The collector may have an uneven surface to improve the bonding strength of a cathode active material and may have any of various shapes such as that of a film, a sheet, a foil, a net, a porous body, a foam body, a non-woven fabric body, and the like. In the foregoing embodiment according to the present invention, an electrode tab may be formed of the same material as that of the cathode collector.

[Cathode Active Material]

In case of the lithium secondary battery, the cathode active material may include a layered compound such as lithium cobalt oxide ($LiCoO_2$) and lithium nickel oxide ($LiNiO_2$), or a compound substituted with at least one transition metal; a lithium manganese oxide such as the chemical formula $Li_{1+x}Mn_{2-x}O_4$ (where x ranges from about 0 to about 0.33), $LiMnO_3$, $LiMn_2O_3$, and $LiMnO_2$; lithium copper oxide ($Li_2CuO_2$); vanadium oxide such as $LiV_3O_8$, $LiFe_3O_4$, $V_2O_5$, and $Cu_2V_2O_7$; nickelcite lithiated nickel oxide expressed by the chemical formula $LiNi_{1-x}M_xO_2$ (where M=Co, Mn, Al, Cu, Fe, Mg, B, or Ga, and x ranges from about 0.01 to about 0.3); lithium manganese complex oxide expressed by the chemical formula $LiMn_{2-x}M_xO_2$ (where M=Co, Ni, Fe, Cr, Zn, or Ta, and x ranges from about 0.01 to about 0.1) or $Li_2Mn_3MO_8$ (where M=Fe, Co, Ni, Cu, or Zn); $LiMn_2O_4$, with a part of lithium of a chemical formula being substituted with alkaline earth metal ions; disulfide compound; or a complex oxide formed of $Fe_2(MoO_4)_3$, but the present invention is not limited thereto.

The conductive material is commonly added in an amount of about 1 to about 50% by weight on the basis of the total weight of the mixture including the cathode active material. Any conductive material may be used without particular limitation so long as it has suitable conductivity without causing adverse chemical changes in the batteries. For example, the conductive material may include conductive material such as: graphite such as natural graphite and artificial graphite; carbon black such as acetylene black, Ketjen black, channel black, furnace black, lamp black, and thermal black; conductive fiber such as carbon fiber and metal fiber; metal powder such as carbon fluorine, aluminum, and nickel powder; conductive whisker such as zinc oxide and potassium titanate; conductive oxide such as titanium oxide; or polyphenylene derivatives.

The binder is a component that assists in the binding between the active material and conductive material and in the binding with the collector. The binder is commonly added in an amount of about 1 to about 50% by weight on the basis of the total weight of the compound including the cathode active material. Examples of the binder may include polyvinylidene difluoride, polyvinyl alcohol, carboxymethylcellulose (CMC), starch, hydroxypropylcellulose, regenerated cellulose, Polyvinyl pyrollidone, tetrafluoroethylene, polyethylene, polypropylene, ethylene-propylene-diene terpolymer (EPDM), sulfonated EPDM, styrene butadiene rubber, fluorinated rubber, various copolymers, and the like.

The filler is a component selectively used to inhibit expansion of the anode. There is no particular limit to the filler, so long as it does not cause adverse chemical changes in the batteries and is a fibrous material. Examples of the filler may include olefin polymers such as polyethylene and polypropylene; and fibrous materials such as glass fibers and carbon fibers.

Anode Structure

The anode electrode is formed by applying, drying, and pressing an anode active material on an anode collector. As necessary, the conductive material, the binder, and the filler may be further selectively added to the anode electrode. This structure may be realized in the form of a sheet and then applied to a process in a shape in which the sheet is mounted on a loading roll.

[Anode Collector]

The anode collector is generally fabricated to have a thickness of about 3 μm to about 500 μm. The anode collector is not particularly limited so long as it has conductivity without causing adverse chemical changes in the batteries. The anode collector may be formed of, for example, copper, stainless steel, aluminum, nickel, titanium, fired carbon, or copper stainless that is surface-treated with one of carbon, nickel, titanium, silver, or the like, an aluminum-cadmium alloy, or the like. Also, like the cathode collector, the anode collector may have a fine roughness surface to improve bonding strength with an anode active material. The anode collector may have various shapes such as a film, a sheet, foil, a net, a porous body, a foam body, a non-woven fabric body, and the like. In the foregoing embodiment according to the present invention, an electrode tab may be formed of the same material as that of the anode collector.

[Anode Active Material]

For example, the anode active material may include: carbon such as hard carbon and graphite-based carbon; a complex metal oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, or Ge; Me': Al, B, P, Si, Groups I, II and III elements, or halogen; $0 < x \leq 1$; $1 \leq y \leq 3$; $1 \leq z \leq 8$); a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$ $Bi_2O_3$, $Bi_2O_4$, and $Bi_2O_5$; a conductive polymer such as polyacetylene; or a Li—Co—Ni-based material.

[Separator]

The separator according to the present invention may be realized by simply laminating basic unit bodies manufactured through a simple lamination process, irrelevant to a folding or roll process. Particularly, the adhesion between the separator and the cathode and anode in the laminate may be realized by melting a separator sheet itself within the laminate by using heat so that the separator adheres and is fixed to the cathode and anode. Thus, a pressure may be continuously maintained to enable the electrodes to stably surface-contact the separator sheet.

The separator sheet or the separator interposed between the cathode and anode of a cell are not particularly limited in terms of material if the separator sheet or the separator has a porous structure in which ions are capable of moving. The separator and the separator sheet may or may not be formed of the same material.

As the separator or the separator sheet—for example, an insulating thin film having high ion permeability and mechanical strength—may be used. The separator or the separator sheet typically has a pore diameter of about 0.01 μm to about 10 μm and a thickness of about 5 μm to about 300 μm. For example, sheets or non-woven fabrics made of an olefin polymer such as polypropylene, glass fibers or polyethylene, which have chemical resistance and hydrophobicity, are used as the separator or the separator sheet. When a solid electrolyte such as a polymer is employed as the electrolyte, the solid electrolyte may also serve as the separator. The separator may be a polyethylene film, a polypropylene film, a multi-layered film made from combinations of these films, or a polymer film for a polymer electrolyte or gel-type polymer electrolyte such as polyvinylidene fluoride, polyethylene oxide, polyacrylonitrile, or polyvinylidene fluoride hexafluoropropylene copolymer.

The separator may have an adhesion function through thermal bonding to constitute the basis unit cell. The separator sheet may also (but not necessarily) have the adhesion function.

The electrode assembly according to the present invention may be applicable to electrochemical cells that produce electricity by using an electrochemical reaction between the cathode and the anode. Representative examples of the electrochemical cells may include super capacitors, ultra capacitors, secondary batteries, fuel cells, all sorts of sensors, machines for electrolysis, and electrochemical reactors. Among these, the electrochemical cells may be mainly used for the secondary batteries.

Such a secondary battery may have a structure in which a chargeable/dischargeable electrode assembly is built in a battery case in a state where the electrode assembly is immersed in an ion-containing electrolyte. For example, the secondary battery may be a lithium secondary battery.

In recent years, the lithium secondary battery has been attracting much attention as a power source for large-scale devices as well as small-sized devices. When the lithium secondary battery is applied in the above-described fields, the lithium secondary battery may have little weight. To reduce the weight of the secondary battery, the electrode assembly may be built in a pouch-type case made of aluminum laminate sheets. Since the lithium secondary battery is well-known in the art, a detailed description thereof will not be provided.

Also, as described above, when the secondary battery is used for power sources for medium-large sized devices, the secondary battery may have a structure in which: a deterioration in the operational performance thereof is maximally inhibited even over prolonged use, a superior life-cycle is realized, and mass production is possible at low cost. In this respect, the secondary battery including the electrode assembly according to the present invention may be used for medium-large sized battery modules that use the secondary battery as a unit battery.

In case of a battery pack including the battery module with the plurality of secondary batteries, the battery pack may be used as at least one power source for: power tools; electric vehicles (EVs) including hybrid electric vehicles (HEVs) and plug-in hybrid electric vehicles (PHEVs); E-bikes; E-scooters; electric golf carts; electric trucks; and electric commercial vehicles.

The medium-large sized battery module may be configured to provide high-output and large-capacity by connecting the plurality of unit cells to each other in series or in serial-parallel connection. However, since this structure is well-known in the art, a detailed description thereof will not be provided.

While the present invention has been shown and described in connection with the exemplary embodiments, it will be apparent to those skilled in the art that modifications and variations can be made without departing from the spirit and scope of the invention as defined by the appended claims.

What is claimed is:

1. An electrode assembly comprising:
   a cathode and anode of which a cathode collector and anode collector are coated with a cathode active material and anode active material, respectively;
   a separator disposed between the cathode and the anode; and
   an insulation layer that is attached to a tab part of the cathode collector and to an end of the cathode active material,
   wherein the separator adheres to both the insulation layer and the end of the cathode active material.

2. The electrode assembly of claim 1, wherein the insulation layer is disposed between the cathode collector and the separator, and a portion of the insulation layer is disposed to overlap an area that is coated with the anode active material.

3. The electrode assembly of claim 1, wherein the insulation layer has an exposed portion at which an end of the tab part is exposed.

4. The electrode assembly of claim 3, wherein the insulation layer has a width of about 1 mm to about 20 mm.

5. The electrode assembly of claim 4, wherein the insulation layer has a thickness of about 1 μm to about 100 μm.

6. The electrode assembly of claim 1, wherein the insulation layer is realized by applying an insulation material containing at least one ceramic material.

7. The electrode assembly of claim 6, wherein the insulation layer is formed of at least one material or a mixture of at least two materials selected from the group consisting of titanium dioxide, calcium carbonate, and barium sulfate.

8. The electrode assembly of claim 7, wherein the insulation layer is realized by applying a solution or paint that contains about 10% to about 90% by weight ratio of the at least one material or the mixture of the at least two materials selected from the group consisting of titanium dioxide, calcium carbonate, and barium sulfate and then drying the coating material.

9. The electrode assembly of claim 1, wherein the insulation layer is realized by bonding and applying a polymer film or emulsion having a weight-average molecular weight of about 200,000 or less onto the tab part.

10. The electrode assembly of claim 9, wherein the polymer film is formed of at least one material selected from the group consisting of polyacrylate, polystyrene, polyacrylic acid, polyacrylonitrile, polyethylene, polypropylene, polyimide, polyurethane, polyethylene terephthalate, and a combination thereof.

11. The electrode assembly of claim 1, wherein the insulation layer comprises a styrene-butadiene rubber (SBR)-based polymer.

12. An electrochemical device comprising at least one of the electrode assembly of claim 1.

13. The electrochemical device of claim 12, wherein the electrochemical device being the one selected from the group consisting of a secondary battery, a battery module comprising a plurality of secondary batteries, and a battery pack comprising a plurality of battery modules.

* * * * *